United States Patent [19]

Saiki et al.

[11] 4,273,899
[45] Jun. 16, 1981

[54] FIRE-RETARDANT THERMOPLASTIC POLYESTER COMPOSITION

[75] Inventors: Noritsugu Saiki, Iwakuni; Takashi Kaneko, Matsuyama, both of Japan

[73] Assignees: Teijin Limited, Osaka; Teijin Chemicals, Ltd., Tokyo, both of Japan

[21] Appl. No.: 44,242

[22] Filed: May 31, 1979

Related U.S. Application Data

[63] Continuation of Ser. No. 803,774, Jun. 6, 1977, abandoned.

[30] Foreign Application Priority Data

Jun. 11, 1976 [JP] Japan .................................. 51-67589

[51] Int. Cl.$^3$ ...................... C08G 63/62; C08L 67/02
[52] U.S. Cl. ............................. 525/439; 260/45.7 R; 260/45.75 B
[58] Field of Search ................. 525/439; 260/45.95 R, 260/45.7 R, 45.7 B

[56] References Cited

U.S. PATENT DOCUMENTS

| 3,833,685 | 9/1974 | Wambach | 525/439 |
|---|---|---|---|
| 3,915,926 | 10/1975 | Wambach | 525/439 |
| 3,936,400 | 2/1976 | Wambach | 525/439 |
| 3,953,394 | 4/1976 | Fox et al. | 525/439 |
| 3,985,705 | 10/1976 | Georgoudis | 260/45.95 R |
| 4,035,542 | 7/1977 | Rosenthal et al. | 525/439 |
| 4,041,019 | 8/1977 | Binsack et al. | 260/45.95 R |
| 4,044,073 | 8/1977 | Baron et al. | 525/439 |
| 4,056,504 | 11/1977 | Grundmeier et al. | 525/439 |

Primary Examiner—Allan Lieberman
Attorney, Agent, or Firm—Sherman & Shalloway

[57] ABSTRACT

A fire-retardant thermoplastic polyester resin composition consisting essentially of (A) 100 parts by weight of an aromatic polyester resin, (B) 1 to 100 parts by weight of a fire retardant which is a medium molecular weight polymer of a carbonate of a brominated dihydric phenol having at least about 16 recurring units optionally with an antimony compound, (C) 0 to about 120 parts by weight of glass fibers, and (D) 0 to about 10 parts by weight of at least one additive.

8 Claims, 1 Drawing Figure

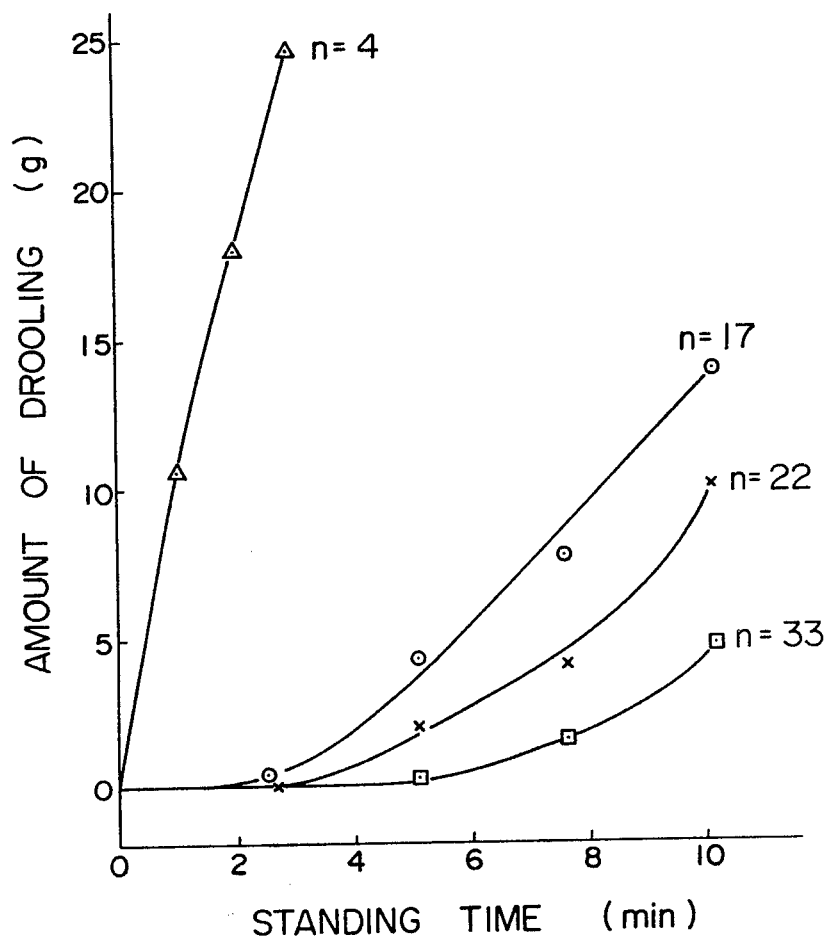

FIRE-RETARDANT THERMOPLASTIC POLYESTER COMPOSITION

This is a continuation, of Application Ser. No. 803,774, filed June 6, 1977, now abandoned.

This invention relates to a fire-retardant thermoplastic polyester resin composition having superior color, appearance and thermal stability.

More specifically, the invention relates to a fire-retardant thermoplastic polyester resin composition consisting essentially of (A) 100 parts by weight of an aromatic polyester,
(B) 1 to 100 parts by weight of a fire retardant which is a medium molecular weight polymer of a carbonate of a brominated dihydric phenol of the formula

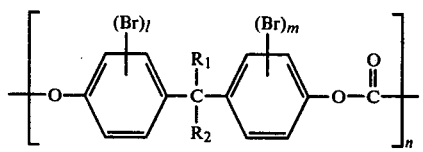

wherein l and m each represent an integer of 1 to 4, n represents a number of at least about 16, and $R_1$ and $R_2$ each represent a hydrogen atom or an alkyl group containing 1 to 5 carbon atoms or, taken together, represent a cycloalkane containing 5 to 12 carbon atoms, or both said carbonate polymer and an antimony compound, the amount of the antimony compound being calculated as metallic antimony, (C) 0 to about 120 parts by weight of glass fibers, and
(D) 0 to about 10 parts by weight of at least one additive selected from the group consisting of stabilizers, coloring agents, mold releasing agents, nucleating agents, lubricants, inorganic fillers other than the glass fibers, and blowing agents.

Thermoplastic polyesters typified by polyalkylene terephthalates such as polyethylene terephthalate or polybutylene terephthalate have been used in component parts of electric machinery and appliances and in other applications as shaped articles obtained by, for example, injection molding. These thermoplastic polyesters are flammable, and therefore limited in their application. Many attempts have been made to render thermoplastic polyesters fire-retardant in order to remove such a limitation. For example, halogen-containing compounds, such as those containing such a group as a hydroxyl or carboxyl group, have been suggested as fire retardants, but they have the defect of causing a marked reduction in the viscosities of polyesters. The use of a polysubstituted bromobenzene such as hexabromobenzene or decabromodiphenyl ether as a fire retardant is also not satisfactory. Such a compound may adhere as a white powder to the surface of a mold in the injection-molding of a polyester composition containing it, or bleeds out onto the surface of the molded article and precipitates on the surface as a white powder ("chalking"). This debases the appearance of the molded article, or may cause the corrosion of the mold and other parts of the molding machine.

As another prior suggestion, polyester resin compositions containing a low molecular weight polymer or copolymer of a carbonate of a halogenated dihydric phenol (which may be referred to herein as a low molecular weight halogenated polycarbonate) are known (for example, U.S. Pat. Nos. 3,833,685; 3,855,277; 3,915,926; and 3,953,394). These resin compositions have in common a low molecular weight halogenated polycarbonate as a fire retardant. It is stated in U.S. Pat. No. 3,855,277 that aromatic polycarbonates used as thermoplastic resins per se have 100 to 400 or more repeating units, and the low molecular weight halogenated polycarbonates used as fire retardants are substantially different from them because they have far less repeating units and are halogenated. The Patent discloses 2 to 10 repeating units for such oligomeric halogenated polycarbonates, and claims about 3 to about 7 such repeating units. U.S. Pat. No. 3,915,926 exemplifies about 2 to about 20 repeating units, but teaches the use of an aromatic carbonate homopolymer in which recurring units comprise bromo-substituted dihydric units in combination with an aromatic carbonate homopolymer comprising dihydric phenol units. The Patent neither discloses nor suggests a composition being free from an aromatic carbonate homopolymer and consisting essentially of an aromatic polyester and the medium molecular weight brominated polycarbonate expressed by the general formula given hereinabove. The same can be said with regard to U.S. Pat. Nos. 3,936,400, 3,833,685, and 3,915,926. U.S. Pat. No. 3,953,394 only teaches the use of low molecular weight halogenated polycarbonate having 1 to 10 repeating units.

None of the prior art references cited above disclose that the medium molecular weight brominated polycarbonate are used singly, not in combination with an aromatic carbonate homopolymer, as a fire retardant for aromatic polyester resins. Neither do they disclose nor suggest that the oligomeric halogenated polycarbonate having not more than 10, preferably about 3 to 7, repeating units disclosed in U.S. Pat. Nos. 3,855,277 and 3,953,394 as usable singly has defects as a fire retardant, and such defects can be remedied by the single use of the medium molecular weight brominated polycarbonate of the above formula.

West German Laid-Open Patent Publication (DTOS) No. 2523010 which discloses a composition containing an aromatic polyester and a grafted copolymer of butadiene as essential components only teaches the utilization of a fire retardant compound containing not more than 10 repeating units.

The present inventors investigated the low molecular weight brominated polycarbonates as a fire retardant for aromatic polyesters, and found that the use of the low molecular weight polymers or copolymers serves to avoid "chalking." On further investigation, they found that the use of low molecular weight brominated polycarbonates containing less than about 10 repeating units causes poor coloration and an undesirable phenomenon known as "drooling" when a polyester composition containing such a polycarbonate is allowed to stand in the molten state. The "drooling" means the phenomenon whereby in the case of injection molding for example, a molding resin flows spontaneously from the tip of an injection nozzle after one cycle of molding and before the next cycle of molding. This makes the next cycle of molding difficult, and frequently leads to the insufficient mold releasing of the molded article, or the insufficient molding of resin. In an attempt to solve this new technical problem, the inventors found that the drooling is an inevitable phenomenon which is due presumably to a reduction in molecular weight caused by the reaction between the polyester resin and the low molecular weight brominated polycarbonate. Unexpectedly, however, the investigations of the inventors led to the discovery that with brominated polycarbonates having at least about 16, preferably at least about 18, especially at least about 20, repeating units, this phenomenon can be substantially avoided. It was further found that when a polyester composition containing the low molecular weight brominated polycarbonate having less than about 10 repeating units is allowed to stand in the molten state for about 15 to 30 minutes, the softening point of the polyester decreases substantially to affect the properties of the polyester adversely, but that when the brominated polycarbonate has at least about 16, preferably at least about 18, especially at least about 20, repeating units, no substantial decrease in the softening point of the polyester occurs even when the polyester composition is allowed to stand in the molten state for more than about 30 minutes, for example for about 1 hour. It was also found that when an aromatic carbonate homopolymer is used together with the low or medium molecular weight brominated polycarbonate, the undesirable decrease in the softening point of the polyester occurs to a greater extent.

It is an object of this invention therefore to provide a fire-retardant thermoplastic polyester resin composition which is substantially free from chalking, drooling and decrease of softening point and has improved color, appearance and thermal stability.

The above and other objects and advantages of this invention will become apparent from the following description.

The aromatic polyester resin as component (A) is an aromatic polyester derived from an aromatic dicarboxylic acid component and a diol component, or a polyester derived from a hydroxycarboxylic acid component and a diol component. Preferred aromatic polyesters are polyalkylene terephthalates or polyalkylene naphthalates derived from terephthalic acid or 2,6-naphthalenedicarboxylic acid and aliphatic glycols containing 2 to 6 carbon atoms. Other polyesters, for example, those obtained by adding a third component as a comonomer in the preparation of the above-mentioned polyesters, or polyesters derived from other dicarboxylic acids or diols, can also be used. Polyesters having a softening point of 140° to 300° C. are especially useful. Those which will attain a maximum temperature of 240° to 300° C. during molding are preferred. The maximum temperature is the temperature of the polymer, and is not the preset temperature of a cylinder at the time of injection molding. Usually, the maximum temperature of the polymer is 10°–20° C. higher than the preset temperature of the cylinder. Thus, especially preferred polyesters for use in this invention are polyethylene terephthalate, polytrimethylene terephthalate, polytetramethylene terephthalate, and polyhexamethylene terephthalates; and polyesters obtained by copolymerizing a third component with the aforesaid polyalkylene terephthalates. Examples of the third component that can be used include aromatic dicarboxylic acids such as orthophthalic acid, isophthalic acid, diphenyldicarboxylic acid or diphenoxyethanedicarboxylic acid, aliphatic or alicyclic dicarboxylic acids such as adipic acid, sebacic acid, azelaic acid, decanedicarboxylic acid or cyclohexanedicarboxylic acid, aliphatic or alicyclic diols such as neopentyl glycol or cyclohexane, dimethanol, aromatic diols such as hydroquinone, 2,2-bis(hydroxyphenyl)propane or 2,2-bis (hydroxyethoxyphenyl)propane, and hydroxycarboxylic acids such as ε-hydroxycaproic acid, hydroxybenzoic acid or hydroxyethoxybenzoic acid. Furthermore, a dicarboxylic acid and a glycol constituting one of the above-illustrated polyesters may be used as a third component for another polyester.

In the preparation of the composition of this invention, other resin components, such as aromatic polycarbonates used as thermoplastic resins per se having high molecular weight with 100 or more repeating units, or grafted copolymers of butadiene, are not used.

The medium molecular weight polymer of a carbonate of a brominated dihydric phenol used as a fire retardant in the composition of this invention is expressed by the following formula

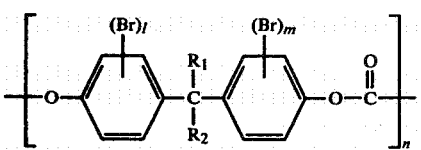

wherein l and m each represent an integer of 1 to 4, n is a number of at least about 16, preferably at least about 18, more preferably at least about 20, especially preferably at least about 22, and $R_1$ and $R_2$ represent a hydrogen atom or an alkyl group containing 1 to 5 carbon atoms, or taken together, represent a cycloalkane containing 5 to 12 carbon atoms.

The fire retardant may be a combination of the above compound and an antimony compound. In the above formula, n is a number of up to about 50, which is considerably smaller than the number of repeating units (100 or more) of aromatic polycarbonates used as thermoplastic resins per se, but is considerably larger than the number of repeating units (up to 10) of the low molecular weight aromatic polycarbonates used singly in the prior art references.

Preferred medium molecular weight polycarbonates for use in this invention are those having a melting point of more than 280° C., especially more than 300° C., which are derived from brominated bisphenol A, especially tetrabromobisphenol A. The use of the previously suggested lower molecular weight polycarbonates is likely to cause an undesirable decrease in the molecular weight of aromatic polyester resins which are in the molten state.

The medium molecular weight brominated polycarbonates can be prepared by a usual method, for example by reacting brominated bisphenols with phosgene. End-blocking agents are not used in the preparation of the polycarbonates, or only those end-blocking agents which do not cause a drastic reduction in melting point are used. Examples of such end-blocking agents are aromatic monohydroxy compounds optionally substituted by a halogen or an organic group, such as phenol, naphthol, derivatives of phenol or naphthol resulting from substitution by an alkyl group containing 1 to 4 carbon atoms or 1 to 5 halogen atoms (e.g. cresols, t-butyl phenol, o- or p-chlorophenol, 2,4,6-trichlorophenol, o- or p-bromophenol, and 2,4,6-tribromophenol).

One example of preparing the medium molecular weight brominated polycarbonate comprises adding a 5–20% aqueous alkali solution and methylene chloride to tetrabromobisphenol A and an end-blocking agent to form a solution, blowing phosgene into the solution while maintaining it at 20° to 30° C. and a pH of about 12, performing the reaction for an additional 30 minutes to 3 hours, separating the methylene chloride layer, washing the methylene chloride layer with water, and separating the resulting polycarbonate either by adding water to the washed methylene chloride layer and heating the mixture at a temperature above the boiling point of the methylene chloride to remove the methylene chloride or by adding a non-solvent such as methanol to the methylene chloride layer to precipitate the polycarbonate. Generally, the polycarbonate-forming reaction is carried out in the presence of a nitrogen-containing compound such as trimethylamine, triethylamine or pyridine as a catalyst.

Preferably, the particle size of the medium molecular weight brominated polycarbonate used in this invention is small. For example, fine particles at least 80% by weight of which have a particle size of not more than 50 microns are preferred for imparting fire retardancy and good properties to the resulting composition. More preferably, all the particles have a size of not more than 100 microns, especially not more than 50 microns, and at least 80% by weight of them have a size of not more than 20 microns.

In addition to the aromatic polyester and the brominated polycarbonate, the fire-retardant polyester composition of the invention preferably contains 1 to 100 parts by weight, per 100 parts by weight of the polyester, of an antimony compound calculated as metallic antimony as a fire retarding assistant. The antimony compound should not decompose at below 300° C., nor react with the other ingredients of the composition. Antimony trioxide is especially preferred.

The composition may contain 0 to 120 parts by weight, preferably not more than 100 parts by weight, more preferably not more than 80 parts by weight, per 100 parts by weight of the polyester, of glass fibers as component (C).

The composition of this invention may be in various forms such as powders, granules, flakes, pellets or other forms of molding material, or melt-shaped articles in various forms such as extrusion-molded articles or injection-molded articles. The composition may further contain various additives such as stabilizers, coloring agents (embracing fluorescent bleaching agents), mold releasing agents, nucleating agents, lubricants, inorganic fillers other than glass fibers, and blowing agents.

The stabilizers may, for example, be oxidation stabilizers, light stabilizers, and heat stabilizers. Specific examples of the light stabilizers are benzotriazole compounds such as 2-hydroxy-5-methylbenzotriazole or 2-hydroxy-3-chloro-5-t-butylbenzotriazole, benzophenone compounds such as 2,4-dihydroxybenzophenone, and phenyl salicylate-type compounds such as phenyl salicylate. Examples of the oxidation stabilizers include hindered phenol compounds such as stearyl 3,5-di-t-butyl-4-hydroxyphenyl propionate, and amine compounds such as N,N'-di-$\beta$-naphthyl-para-phenylene diamine. Examples of the heat stabilizers include sulfur compounds such as dilauryl thiopropionate, and phosphorus compounds such as phosphoric acid, phosphorus acid, phosphinic acid, phosphonic acid, or esters of these. The coloring agents may be any desired dye or pigment.

Silicones are examples of the mold releasing agents. Examples of the lubricants are barium stearate, calcium stearate, and liquid paraffin. The nucleating agents may, for example, be inorganic nucleating agents such as talc, organic nucleating agents such as benzophenone, or salts such as sodium terephthalate.

The fillers other than glass fibers include, for example carbon fibers, asbestos, rock wool, powders of carbon, clay and silica. Incorporation of these fillers is preferred because they improve the mechanical characteristics, resistance to heat distortion, and fire retardancy of the composition of this invention.

Preferably, the amounts of these additives, which vary somewhat according to the types of the additives, are up to 10 parts by weight per 100 parts by weight of the polyester resin (A). For example, the amounts are not more than 10 parts by weight, more preferably not more than 5 parts by weight for stabilizers; 0.05 to 10 parts by weight, preferably up to 5 parts by weight, for mold releasing agents; 0.01 to 10 parts by weight, preferably up to 5 parts by weight, for nucleating agents; 0.01 to 10 parts by weight, preferably up to 5 parts by weight, for lubricants; and 1 to 10 parts by weight for fillers. The amount of the coloring agent is usually 0.01 to 10 parts by weight, preferably up to 5 parts by weight.

The degree of self-distinguishing properties of the fire-retardant thermoplastic resin composition of this invention is such that a thin sample of the composition having a thickness of at least $\frac{1}{8}$ inch has a fire retardancy of 94 V-2 or higher as determined by the method described in the revised edition of UL-94 issued on June 10, 1974. Preferably, a 1/16 inch or 1/32 inch sample has a fire retardancy of 94 V-2 or higher.

The composition of this invention can be produced by various methods. According to one of them, an aromatic polyester (A), a fire retardant (B) and glass fibers (C) as required and an additive (D) in proper proportions are mixed and fed into an extrusion mixer to form pellets. Another method comprises first preparing pellets from at least one of components (A) and (B) with or without at least one of components (C) and (D), then mixing the pellets with remaining components, and forming the mixture into pellets. It is also possible to mold a mixture of components (A), (B), (C) and (D) in suitable proportions directly by an injection molding or transfer molding method. Preferably, each of the components should be dehydrated to the greatest possible extent before molding. It is also preferred at the time of mixing to shorten the residence time in the machine, control the temperature carefully and utilize frictional heat in order to ensure intimate mixing of the polyester resin with the additives.

The composition can be shaped by employing the apparatus and conditions which are customarily used for thermoplastic resin compositions. For example, when poly(1,4-butylene terephthalate) is used, good results are obtained by injection molding at an ordinary cylinder temperature (e.g., 240° to 260° C.) and an ordinary mold temperature (e.g., 40° to 140° C.). In the case of poly(butylene-2,6-naphthalate), good results are obtained at a cylinder temperature of 250° to 270° C. and a mold temperature of 40° to 140° C. On the other hand, when poly(ethylene terephthalate) is used, somewhat different methods from the ordinary ones are employed because the polymer does not crystallize uniformly from its inside toward its outside. For example, the composition is first incorporated with a crystallization promoter (e.g., graphite or a metal oxide such as ZnO or MgO), and then molded at a standard mold temperature of 60° to 80° C. Or without using a nucleating agent, the molding is done at a mold temperature of at least 140° C.

In the case of incorporating glass fibers (C), a glass roving (an assembly of strands of glass filaments) is cut to a length of, say, 0.3 to 1.2 cm and fed into an extrusion mixer together with the polyester resin (A) and the fire retardant (B) to form pellets. The fibers are shortened during this treatment and dispersed again to have a length of less than 0.2 mm. In another method, the glass filaments (C) are made short by comminuting, and dry-mixed with the polyester resin (A), the fire retardant (B) and the additive (D). The resulting mixture is comminuted and kneaded, or extruded and shred. Still another method comprises drawing a continuous length of a glass roving through a bath containing the molten polyester resin (A) and the fire retardant (C) to coat the glass roving, and cutting the coated roving to a size of, say, 0.3 to 0.5 cm. It is also possible to mix the glass fibers with the resin and the additive, and directly shape the mixture by an injection molding or transfer molding technique.

The composition of this invention is free from chalking, and exhibits better thermal stability and weatherability than compositions containing other fire retardants. However, the composition undergoes less deterioration in properties (e.g., softening point, color, strength, drooling) during residence, and has better thermal stability, than compositions containing low molecular weight polycarbonates derived from brominated bisphenols.

The following Examples illustrate the present invention in more detail. In the Examples, all parts are parts by weight. The intrinsic viscosity [$\eta$] was measured in o-chlorophenol at 35° C. The intrinsic viscosity of a composition was measured after separating the insoluble matter by filtration and leaving the polyester only.

EXAMPLE 1 AND COMPARISON

Polytetramethylene terephthalate (55 parts) having an intrinsic viscosity [$\eta$] of 0.85, 30 parts of glass fibers, 5 parts of antimony trioxide, and 10 parts of polycarbonate derived from tetrabromobisphenol A, phosgene and t-butyl phenol and having about 4, 17, 22 or 33 repeating units on an average and a particle diameter of less than about 10 microns (the average number of repeating units was calculated from the amounts of terminal groups and the tetrabromobisphenol A determined by NMR) were mixed in an extruder having a screw diameter of 65 mm and a cylinder temperature of 250° C.

The resulting composition was molded by an injection molding machine (1S-60B, a product of Toshiba Machinery, Co., Ltd.) successively through ten cycles at a molding temperature of 260° C. with a total molding cycle of 35 seconds. The molding was performed by varying the time during which the molding composition was allowed to stand in the machine before the next successive molding, and the amount of the resin which drooled from the molding nozzle during this time was measured. The results are shown in FIG. 1 which graphically illustrates the amount of drooling versus standing time for different values of "n". The properties of the molded article which was obtained in the first cycle after resumption of the successive molding after 10 minutes from the previous successive molding, and of the molded article obtained in the 10th cycle after the resumption are shown in Table 1.

TABLE 1

| n of the fire retardant | Tensile strength (kg/cm$^2$) of the molded articles | |
|---|---|---|
| | Molded article in the first cycle after standing | Molded article in the 10th cycle |
| 4 | 755 | 1205 |
| 17 | 997 | 1150 |
| 22 | 1168 | 1223 |
| 33 | 1179 | 1184 |

EXAMPLE 2 AND COMPARISON

Polytetramethylene terephthalate (100 parts) having an intrinsic viscosity [$\eta$] of 1.1, 12.5 parts of antimony trioxide, and 12.5 parts of polycarbonate derived from tetrabromobisphenol A, phosgene and t-butylphenol and having about 4, 7, 10, 17, 22 or 33 repeating units on an average and a particle size of less than about 10 microns were mixed in the same way as in Example 1 to form a composition.

The above procedure was repeated except that 90 parts of the polytetramethylene terephthalate and 10 parts of an aromatic carbonate homopolymer of bisphenol A (120 repeating units) were used instead of 100 parts of the polytetramethylene terephthalate to form a composition.

Each of these compositions was maintained in the molten state in an atmosphere of nitrogen at 260° C. for 2 hours, and then its softening point was measured. The results are shown in Table 2.

TABLE 2

| Amount of the aromatic carbonte homopolymer | n | | | | | |
|---|---|---|---|---|---|---|
| | 4 | 7 | 10 | 17 | 22 | 33 |
| 0 | 224.9 (comparison) | 224.9 (comparison) | 225.0 (comparison) | 226.3 (invention) | 226.3 (invention) | 227.2 (invention) |
| 10 parts | 207.0 (comparison) | 207.0 (comparison) | 207.2 (comparison) | 208.4 (comparison) | 210.1 (comparison) | 210.6 (invention) |

EXAMPLES 3 AND 4 AND COMPARISON

Polybutylene terephthalate (100 parts) having an intrinsic viscosity [$\eta$] of 1.1, 12.5 parts of antimony trioxide and 12.5 parts of polycarbonate derived from tetrabromobisphenol A, phosgene and t-butyl phenol and having about 20 or 33 repeating units on an average and a particle size of not more than 10 microns (the average number of repeating units was calculated from the amounts of terminal groups and the tetrabromobisphenol A determined by NMR) were mixed at 250° C. in an extruder with a screw diameter of 65 mm and a cylinder temperature of 250° C.

The properties of articles obtained by injection-molding of the resulting polyester compositions were determined, and the results are shown in Table 3.

The molded products were allowed to stand in an atmosphere of nitrogen at 260° C. in a flask, and their changes in softening point (Vicat softening point) and intrinsic viscosity [η] were measured. The results are shown in Table 3.

For comparison, the above procedure was repeated except that polycarbonate derived from tetrabromobisphenol A, phosgene and t-butyl phenol and having 5 repeating units on an average and a particle diameter of not more than 10 microns was used. The properties of the resulting polyester composition are also shown in Table 3.

A composition having the polycarbonate with 20 repeating units on an average could be molded with a molding cycle of 45 seconds, but a composition containing the polycarbonate having 5 repeating units on an average could not be formed into good quality molded products even with a molding cycle of 60 seconds because its releasing from the mold was poor.

The properties of a molded article obtained without allowing the composition to reside for 5 minutes in the cylinder beforehand were determined, and the results are shown in Table 4.

TABLE 3

| Test items | Unit | Method of measurement | Example 3 | Example 4 | Comparison |
|---|---|---|---|---|---|
| Average number of repeating units of polycarbonate | — | NMR | 20 | 33 | 5 |
| Melting point of the polycarbonate | °C. | Using a micromelting point measuring device (a product of Yanagimoto Co., Ltd.) | 302 | 310 | 251 |
| Properties of polyester composition | | | | | |
| Tensile strength | kg/cm$^2$ | ASTM D-638 | 640 | 630 | 650 |
| Tensile elongation at break | % | ASTM D-638 | 8 | 7 | 8 |
| Impact strength (1/4" notched) | kg · cm/cm | ASTM D-256 | 3.8 | 3.1 | 3.2 |
| Flexural strength | kg/cm$^2$ | ASTM D-790 | 960 | 970 | 980 |
| Flexural modulus | kg/cm$^2$ | ASTM D-790 | 29 × 10$^3$ | 29 × 10$^3$ | 27 × 10$^3$ |
| LOI | % | | 27 | 27 | 26 |
| Tensile Strength after maintaining at 185° C. for 3 days | kg/cm$^2$ | ASTM D-638 | 512 | 585 | 408 |
| Tensile elongation after maintaining at 185° C. for 3 days | % | ASTM D-638 | 4 | 4 | 3 |
| Softening point after standing in N$_2$ atmosphere at 260° C. | | | | | |
| After 30 minutes | °C. | Vicat method | 226.7 | 227.1 | 225.8 |
| After 60 minutes | °C. | Vicat method | 226.8 | 227.2 | 224.9 |
| After 120 minutes | °C. | Vicat method | 226.7 | 227.1 | 223.4 |
| Color after standing in N$_2$ atmosphere at 260° C. (*) | | | | | |
| After 30 minutes | — | Color differential meter, CM-20 (made by Color Machine Co.) | b = +0.5 | b = +0.3 | b = +2 |
| After 60 minutes | | Color differential meter, CM-20 (made by Color Machine Co.) | b = −0.1 | b = −0.3 | b = +9 |
| Chalking after maintaining at 185° C. for 2 hours | | Color differential meter, CM-20 (made by Color Machine Co.) | none | none | none |

(*) In the b value, + shows the degree of yellow, and − shows the degree of blue.

EXAMPLE 5 AND COMPARISON

Polyethylene terephthalate (100 parts) having an intrinsic viscosity [η] of 0.65, 10 parts of antimony trioxide, 55 parts of glass fibers and 15 parts of polycarbonate derived from tetrabromobisphenol A and having an average number of repeating units shown in Table 4 were extruded through an extrusion-molding machine at a cylinder temperature of 290° C. to form chips.

The chips were dried, and molded by an injection-molding machine with a cylinder temperature of 290° C. and a mold temperature of 140° C. after it was allowed to reside in the cylinder for 5 minutes.

TABLE 4

| | Example 5 | Comparison |
|---|---|---|
| Average number of repeating units of polycarbonate | 20 | 5 |
| Properties of the molded articles | | |
| Tensile strength (kg/cm$^2$) | 1250 | 1280 |
| Tensile elongation (%) | 1.5 | 1.5 |
| Flexural strength (kg/cm$^2$) | 1720 | 1700 |
| Flexural modulus (kg/cm$^2$) | 95 × 10$^3$ | 90 × 10$^3$ |

What is claimed is:

1. A fire-retardant thermoplastic polyester resin composition consisting of essentially of (A) 100 parts by weight of an aromatic polyester resin, (B) 1 to 100 parts by weight of a fire retardant which is a medium molecular weight polymer of a carbonate of a brominated dihydric phenol of the formula

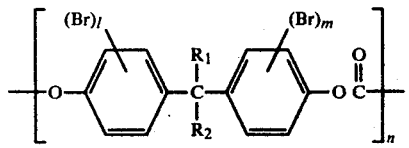

wherein l and m each represent an integer of 1 to 4, n represents a number of about 22 to about 50, and $R_1$ and $R_2$ each represent a hydrogen atom or an alkyl group containing 1 to 5 carbon atoms, or taken together, represent a cycloalkane containing 5 to 12 carbon atoms, the carbonate polymer having a melting point of more than 300° C., or both said carbonate polymer and 1 to 100 parts by weight of an antimony compound, the amount of the antimony compound being calculated as metallic antimony, the composition containing no other aromatic carbonate polymer.

(C) 1 to about 120 parts by weight of glass fibers, and (D) 0 to about 10 parts by weight of at least one additive selected from the group consisting of stabilizers, coloring agents, mold releasing agents, nucleating agents, lubricants, inorganic fillers other than the glass fibers and blowing agents.

2. The composition of claim 1 wherein the aromatic polyester resin (A) is selected from the group consisting of polyethylene terephthalate, polytrimethylene terephthalate, polytetramethylene terephthalate, and polyhexamethylene terephthalate.

3. The composition of claim 1 which contains the glass fibers (C) as an essential component in an amount of not more than about 120 parts.

4. The composition of claim 1 wherein the fire retardant (B) is in the form of particles at least 80% by weight of which have a particle size of not more than 50 microns.

5. A method for preparing a fire-retardant thermoplastic polyester resin composition without deteriorating the color tone of the polyester and said thermoplastic polyester resin composition being substantially free from drooling when allowed to stand in the molten state, said method comprising incorporating in an aromatic polyester resin from 1 to 100 parts by weight, per 100 parts by weight of the aromatic polyester resin, of a fire-retardant which is a medium molecular weight polymer of a carbonate of a brominated dihydric phenol of the formula

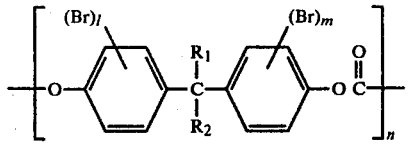

wherein l and m each represent an integer of 1 to 4, n represents a number of about 22 to about 50, and $R_1$ and $R_2$ each represent a hydrogen atom or an alkyl group containing 1 to 5 carbon atoms, or, taken together, represent a cycloalkane containing 5 to 12 carbon atoms, or both said carbonate polymer and 1 to 100 parts by weight of an antimony compound, the amount of the antimony compound being calculated as metallic antimony, the carbonate polymer having a melting point of more than 300° C. and the composition containing no other aromatic carbonate polymer.

6. The method of claim 5 wherein the aromatic polyester resin is selected from the group consisting of polyethylene terephthalate, polytrimethylene terephthalate, polytetramethylene terephthalate, and polyhexamethylene terephthalate.

7. The method of claim 5 which further comprises incorporating in the aromatic polyester resin composition glass fibers in an amount of not more than 120 parts per 100 parts of the aromatic polyester resin.

8. The method of claim 5 wherein the fire-retardant of the formula is in the form of particles at least 80% by weight of which have a particle size of not more than 50 microns.

* * * * *